US011592826B2

(12) United States Patent
Huang et al.

(10) Patent No.: US 11,592,826 B2
(45) Date of Patent: Feb. 28, 2023

(54) METHOD, SYSTEM AND APPARATUS FOR DYNAMIC LOOP CLOSURE IN MAPPING TRAJECTORIES

(71) Applicant: Zebra Technologies Corporation, Lincolnshire, IL (US)

(72) Inventors: Ziehen Huang, Richmond Hill (CA); Harsoveet Singh, Mississauga (CA); Jonathan Kelly, Toronto (CA); Mahyar Vajedi, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 289 days.

(21) Appl. No.: 16/719,541

(22) Filed: Dec. 18, 2019

(65) Prior Publication Data

US 2020/0209881 A1    Jul. 2, 2020

(30) Foreign Application Priority Data

Dec. 28, 2018  (CA) ................................ CA 3028708

(51) Int. Cl.
*G05D 1/02*        (2020.01)

(52) U.S. Cl.
CPC ......... *G05D 1/0221* (2013.01); *G05D 1/0274* (2013.01); *G05D 2201/0216* (2013.01)

(58) Field of Classification Search
CPC .............. G05D 1/0253; G05D 1/0221; G05D 1/0274; G05D 2201/0216; G05D 1/0248;
(Continued)

(56) References Cited

U.S. PATENT DOCUMENTS

| 5,209,712 A | 5/1993 | Ferri |
| 5,214,615 A | 5/1993 | Bauer |

(Continued)

FOREIGN PATENT DOCUMENTS

| CA | 2835830 | 11/2012 |
| CA | 3028156 | 1/2018 |

(Continued)

OTHER PUBLICATIONS

Kaikai Liu and Xiaolin Li. 2015. Enabling Context-Aware Indoor Augmented Reality via Smartphone Sensing and Vision Tracking. ACM Trans. Multimedia Comput. Commun. Appl. 12, 1s, Article 15 (Oct. 2015). (Year: 2015).*

(Continued)

*Primary Examiner* — Jeffrey C Boomer

(57) ABSTRACT

A method for dynamic loop closure in a mobile automation apparatus includes: obtaining mapping trajectory data defining a plurality of trajectory segments traversing a facility to be mapped; controlling a locomotive mechanism of the apparatus to traverse a current segment; generating a sequence of keyframes for the current segment using sensor data captured via a navigational sensor of the apparatus; and, for each keyframe: determining an estimated apparatus pose based on the sensor data and a preceding estimated pose corresponding to a preceding keyframe; and, determining a noise metric defining a level of uncertainty associated with the estimated pose relative to the preceding estimated pose; determining, for a selected keyframe, an accumulated noise metric based on the noise metrics for the selected keyframe and each previous keyframe; and when the accumulated noise metric exceeds a threshold, updating the mapping trajectory data to insert a repetition of one of the segments.

20 Claims, 9 Drawing Sheets

(58) Field of Classification Search
CPC ............ G06T 7/74; G06T 2207/10016; G06T 2207/30244; G06T 2207/30261; G06T 7/579; G01C 21/206; G06V 20/46; G06V 20/10; G06V 20/52

See application file for complete search history.

(56) References Cited

U.S. PATENT DOCUMENTS

| | | | |
|---|---|---|---|
| 5,408,322 A | 4/1995 | Hsu et al. |
| 5,414,268 A | 5/1995 | McGee |
| 5,423,617 A | 6/1995 | Marsh et al. |
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,133,951 B1 | 11/2018 | Mendonca et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | Deluca |
| 10,352,689 B2 | 7/2019 | Brown et al. |
| 10,373,116 B2 | 8/2019 | Medina et al. |
| 10,394,244 B2 | 8/2019 | Song et al. |
| 10,429,487 B1 | 10/2019 | Fowe |
| 11,003,188 B2 | 5/2021 | Scott et al. |
| 11,093,753 B2 * | 8/2021 | Kim .............. G06F 16/7837 |
| 11,274,930 B1 * | 3/2022 | Madhivanan .......... G01C 21/32 |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |

(56) References Cited

U.S. PATENT DOCUMENTS

| | | |
|---|---|---|
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0128195 A1 | 6/2005 | Houston et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2005/0237320 A1 | 10/2005 | Itoh et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0278782 A1 | 11/2012 | Pal et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahern et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |

(56) References Cited

U.S. PATENT DOCUMENTS

| | | |
|---|---|---|
| 2014/0052555 A1 | 2/2014 | MacIntosh |
| 2014/0086483 A1 | 3/2014 | Zhang et al. |
| 2014/0088761 A1 | 3/2014 | Shamlian et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0133740 A1 | 5/2014 | Plagemann et al. |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0195491 A1 | 7/2015 | Shaburov et al. |
| 2015/0212521 A1 | 7/2015 | Pack et al. |
| 2015/0235157 A1 | 8/2015 | Avegliano et al. |
| 2015/0243073 A1 | 8/2015 | Chen et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310348 A1 | 10/2015 | Dessouky et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0290805 A1 | 10/2016 | Irish et al. |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0030538 A1 | 2/2017 | Geisler et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0084037 A1 | 3/2017 | Barajas Hernandez et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178301 A1 | 6/2017 | Moraleda et al. |
| 2017/0178310 A1 | 6/2017 | Gornish |
| 2017/0193434 A1 | 7/2017 | Shah et al. |
| 2017/0205892 A1 | 7/2017 | Petrovskaya et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |

(56) References Cited

U.S. PATENT DOCUMENTS

| | | |
|---|---|---|
| 2018/0281191 A1 | 10/2018 | Sinyayskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0025838 A1 | 1/2019 | Artes et al. |
| 2019/0034854 A1 | 1/2019 | Borodow et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0080190 A1* | 3/2019 | Shieh .................. G06V 10/98 |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0108678 A1 | 4/2019 | Hazeghi et al. |
| 2019/0160675 A1 | 5/2019 | Paschal, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1 | 9/2019 | Kingsford |
| 2019/0304132 A1 | 10/2019 | Yoda et al. |
| 2019/0304170 A1* | 10/2019 | Meilland ................ G06T 15/20 |
| 2019/0377952 A1* | 12/2019 | Kim ........................ G06V 20/46 |
| 2019/0392212 A1 | 12/2019 | Sawhney et al. |
| 2020/0049511 A1 | 2/2020 | Sithiravel et al. |
| 2020/0053325 A1 | 2/2020 | Deyle et al. |
| 2020/0068126 A1 | 2/2020 | Fink et al. |
| 2020/0111267 A1 | 4/2020 | Stauber et al. |
| 2020/0118064 A1 | 4/2020 | Perrella et al. |
| 2020/0150655 A1 | 5/2020 | Artes et al. |
| 2020/0192388 A1 | 6/2020 | Zhang et al. |
| 2020/0314333 A1 | 10/2020 | Liang et al. |
| 2020/0341151 A1 | 10/2020 | Yoshida |
| 2020/0410766 A1 | 12/2020 | Swaminathan |
| 2021/0019939 A1 | 1/2021 | Hu et al. |
| 2021/0097739 A1* | 4/2021 | Xie ........................ G01C 22/02 |
| 2021/0163068 A1 | 6/2021 | Zhu et al. |
| 2021/0233305 A1 | 7/2021 | Garcia et al. |
| 2021/0271238 A1 | 9/2021 | Ko et al. |

FOREIGN PATENT DOCUMENTS

| | | |
|---|---|---|
| CN | 102214343 | 10/2011 |
| CN | 104200086 | 12/2014 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Ostafew et al., "Visual Teach and Repeat, Repeat, Repeat: Iterative learning control to improve mobile robot path tracking in challenging outdoor environment", IEEE/RSJ Internationa Conference on Intelligent robots and Systems, Nov. 2013, pp. 176-181 (Year: 2013).*

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 I9, pp. 1-20 (2016).

Norriof et al., "Experimental comparison of some classical iterative learning control algorithms", IEEE Transactions on Robotics and Automation, Jun. 2002, pp. 636-641.

Notice of allowance for U.S. Appl. No. 13/568,175 dated Sep. 23, 2014.

Notice of allowance for U.S. Appl. No. 13/693,503 dated Mar. 11, 2016.

Notice of allowance for U.S. Appl. No. 14/068,495 dated Apr. 25, 2016.

Notice of allowance for U.S. Appl. No. 14/518,091 dated Apr. 12, 2017.

Notice of allowance for U.S. Appl. No. 15/211,103 dated Apr. 5, 2017.

Olson, Clark F., et al. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Park et al., "Autonomous mobile robot navigation using passive rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2n10, Oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

Puwein, J., et al."Robust Multi-view camera calibration for wide-baseline camera networks,"in IEEE Workshop on Applications of computer vision (WACV), Jan. 2011.

(56) References Cited

OTHER PUBLICATIONS

Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Rusu, et al. "Towards 3D Point cloud based object maps for household environments," Science Direct, vol. 56, issue 11, pp. 927-947 [http://www.sciencedirect.com/science/article/pii/S0921889008001140], Nov. 30, 2008. Retrieved from the internet on Jun. 15, 2022.
Schnabel et al. "Efficient RANSAC for Point-Cloud Shape Detection", vol. 0, No. 0, pp. 1-12 (1981).
Senthilkumaran, et al., "Edge Detection Techniques for Image Segmentation-A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=repl&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al.: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.
Carreira et al., "Enhanced PCA-based localization using depth maps with missing data," IEEE, pp. 1-8, Apr. 24, 2013.
Castorena et al., "Autocalibration of lidar and optical cameras via edge alignment", 2016 IEEE International Conference on Acoustics, Speech and Signal Processing (Mar. 20, 2016).
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Clark, "Casino to open world's first NFC-enabled supermarket", (Sep. 19, 2018), pp. 1-7.
Clark, "Jogtek launches passive NFC shelf-edge labels", (Sep. 19, 2018), pp. 1-6.
Cleveland Jonas et al.: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France, [hal-01097361].
Douillard, Bertrand, et al. "On the segmentation of 3D Lidar point clouds." Robotics and Automation (ICRA), 2011 IEEE International Conference on IEEE, 2011.
Dubois, M., et al., "A comparison of geometric and energy-based point cloud semantic segmentation methods," European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, Issn: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).

(56) References Cited

OTHER PUBLICATIONS

Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/CN2017/083143 dated Feb. 11, 2018.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion for International Patent Application No. PCT/US2019/057007 dated Jan. 14, 2020.
International Search Report and Written Opinion for International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
International Search Report and Written Opinion for International Patent Application No. PCT/US2021/057388 dated Feb. 2, 2022.
International Search Report and Written Opinion for International Patent Application No. PCT/IB2021/060948 dated Feb. 4, 2022.
Jadhav et al. "Survey on Spatial Domain dynamic template matching technique for scanning linear barcode," International Journal of science and research v 5 n 3, Mar. 2016)(Year: 2016).
Jian Fan et al.: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammetry, Remote sensing and spatial information Sciences, vol. XXXVIII-5/W12, 2011, ISPRS Calgary 2011 Workshop, Aug. 29-31, 2011, Calgary, Canada.
Lecking et al.: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
Mcnaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.
"Fair Billing with Automatic Dimensioning" pp. 1-4, undated, Copyright Mettler-Toledo International Inc.
"Plane Detection in Point Cloud Data" dated 2010-01-25 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Boden, "French retail chain to roll out NFC shelf edge labels to six hypermarkets" (Sep. 19, 2018), pp. 1-7.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Faade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.

\* cited by examiner

METHOD, SYSTEM AND APPARATUS FOR DYNAMIC LOOP CLOSURE IN MAPPING TRAJECTORIES

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile apparatus may be employed to perform tasks within the environment, such as capturing data for use in identifying products that are out of stock, incorrectly located, and the like. To travel within the environment, the mobile apparatus may be required to track its location relative to a map of the environment. The map itself may be generated from data collected by the apparatus, according to a simultaneous localization and mapping (SLAM) process. Errors in localization, however, can lead to distortions and other errors in the map.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
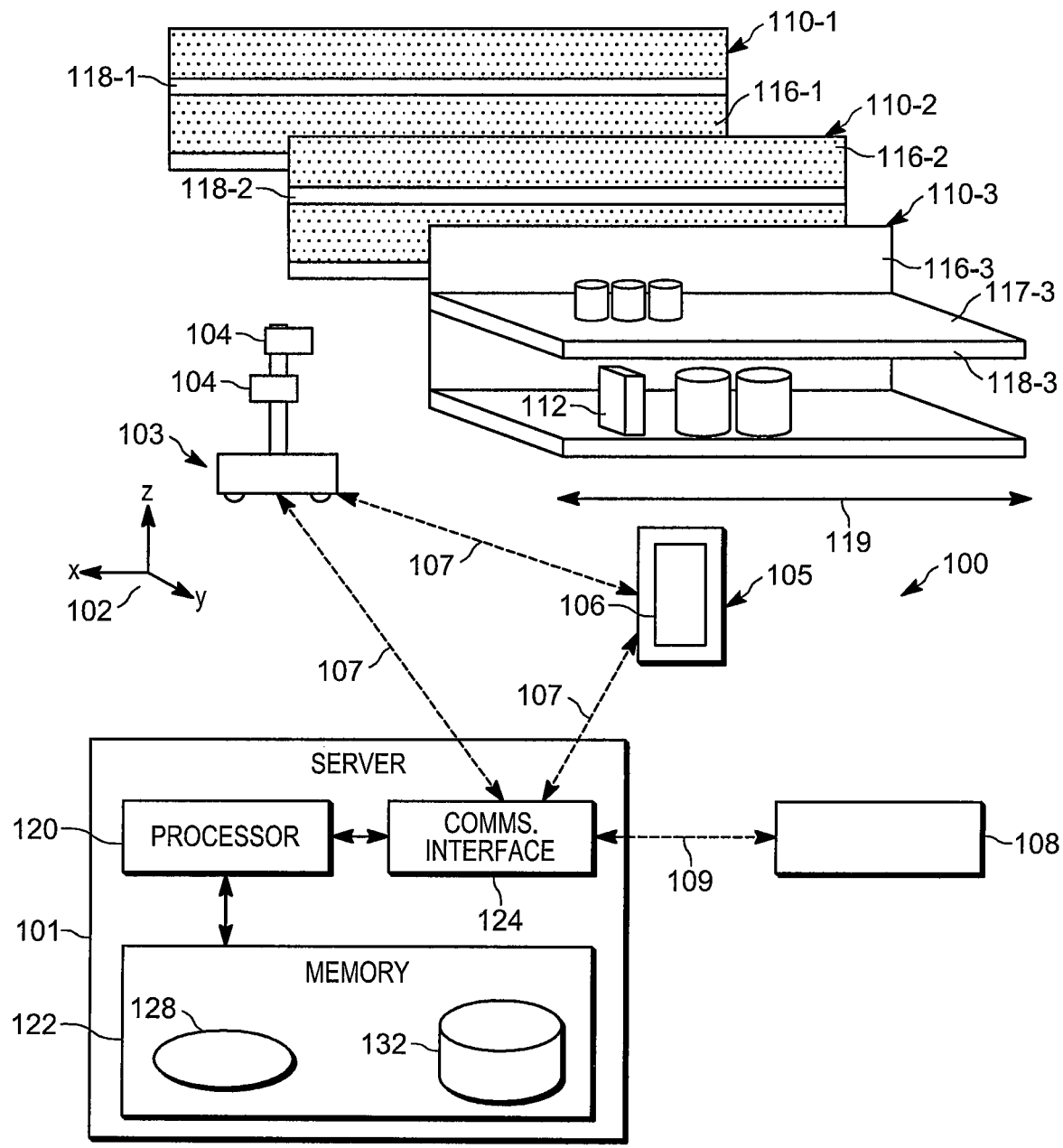
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method for dynamic loop closure in a mobile automation apparatus, the method comprising: at a navigational controller of the mobile automation apparatus, obtaining mapping trajectory data defining a plurality of trajectory segments traversing a facility to be mapped; at the navigational controller, controlling a locomotive mechanism of the mobile automation apparatus to traverse a current one of the trajectory segments; at the navigational controller, generating a sequence of keyframes for the current trajectory segment using sensor data captured via a navigational sensor of the mobile automation apparatus; and, for each keyframe: determining an estimated pose of the mobile automation apparatus based on (i) the sensor data and (ii) a preceding estimated pose corresponding to a preceding one of the keyframes; and, determining a noise metric defining a level of uncertainty associated with the estimated pose relative to the preceding estimated pose; determining, for a selected keyframe, an accumulated noise metric based on the noise metrics for the selected keyframe and each previous keyframe in the sequence; and when the accumulated noise metric exceeds a threshold, updating the mapping trajectory data to insert a repetition of one of the trajectory segments.

Additional examples disclosed herein are directed to a mobile automation apparatus comprising: a memory; a locomotive mechanism; a navigational sensor; a navigational controller connected to the memory, the locomotive mechanism and the navigational sensor; the navigational controller configured to: obtain, from the memory, mapping trajectory data defining a plurality of trajectory segments traversing a facility to be mapped; control the locomotive mechanism to traverse a current one of the trajectory segments; generate a sequence of keyframes for the current trajectory segment using sensor data captured via the navigational sensor; and, for each keyframe: determine an estimated pose of the mobile automation apparatus based on (i) the sensor data and (ii) a preceding estimated pose corresponding to a preceding one of the keyframes; and, determine a noise metric defining a level of uncertainty associated with the estimated pose relative to the preceding estimated pose; determine, for a selected keyframe, an accumulated noise metric based on the noise metrics for the selected keyframe and each previous keyframe in the sequence; and when the accumulated noise metric exceeds a threshold, update the mapping trajectory data to insert a repetition of one of the trajectory segments.

FIG. 1 depicts a mobile automation system 100 in accordance with the teachings of this disclosure. The system 100 is illustrated as being deployed in a retail environment, but in other embodiments can be deployed in a variety of other environments, including warehouses, hospitals, and the like. The environment in which the system 100 is deployed may also be referred to herein generically as a facility.

The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). As also illustrated in FIG. 1, the client device 105 and the apparatus 103 can be connected by a communications link 107. In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The client device 105 includes an output assembly, such as any one or more of a display, a speaker and the like, as well as an input assembly, such as a touch screen integrated with the above-mentioned display, a microphone, and the like. In the illustrated example, the client device 105 includes an integrated display and touch screen, also referred to as an interface assembly 106 or an input/output assembly 106, enabling the client device 105 to present data to an operator of the client device 105, as well as to receive commands from the operator. The system 100 can include a plurality of client devices 105 in communication with the server 101 via respective links 107.

The system 100 is deployed, in the illustrated example, in a retail environment including a plurality of support structures such as shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. The apparatus 103, autonomously or in conjunction with the server 101, is configured to continuously determine its location within the environment, for example with respect to a map of the environment. The map may, for example, define the positions of obstacles such as the shelves 110 according to a frame of reference 102. As will be discussed in greater detail below, the initial generation of the map (e.g. upon deployment of the system 100 in the facility) may be performed by capturing data via the apparatus 103 in a simultaneous mapping and localization (SLAM) process. During such a mapping and localization process, as will be understood by those skilled in the art, distortions in the map and localization errors may be mitigated by periodically repeating the capture of data for certain locations within the facility. Such repeated capture (i.e. by revisiting a previously traversed location) is also referred to as loop-closing. The apparatus 103 is configured, as discussed in detail herein, to dynamically determine when to perform loop closures.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 and to capture data (e.g. images, depth scans and the like of the shelves 110 and other features of the facility) during such navigation.

The server 101 includes a special purpose controller, such as a processor 120, specifically designed to control and/or assist the mobile automation apparatus 103 to navigate the environment and to capture data. The processor 120 can be further configured to obtain the captured data via a communications interface 124 for storage in a repository 132 and subsequent processing (e.g. to generate a map from the captured data, to detect objects such as shelved products 112 in the captured data, and the like). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display via the assembly 106) notifications received from the server 101.

The processor 120 is interconnected with a non-transitory computer readable storage medium, such as the above-mentioned memory 122, having stored thereon computer readable instructions for performing various functionality, including control of the apparatus 103 to capture data within the facility, post-processing of the data captured by the apparatus 103, and generating and providing certain navigational data to the apparatus 103, such as target locations within the facility at which to capture data. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality related to controlling the apparatus 103 to navigate among the shelves 110 and capture data. The processor 120, as configured via the execution of the control application 128, is also referred to herein as the controller 120. As will now be apparent, some or all of the functionality implemented by the controller 120 described below may also be performed by preconfigured special purpose hardware controllers (e.g. one or more FPGAs and/or Application-Specific Integrated Circuits (ASICs) configured for navigational computations) rather than by execution of the control application 128 by the processor 120.

Figure 2A:
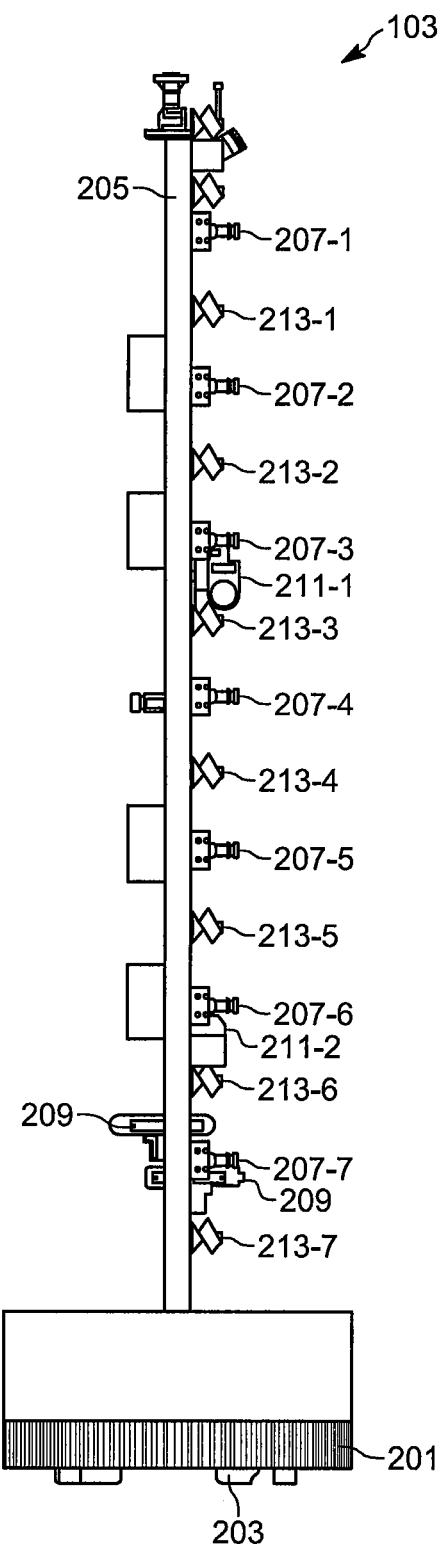
FIG. 2A depicts a mobile automation apparatus in the system of FIG. 1.
Figure 2B:
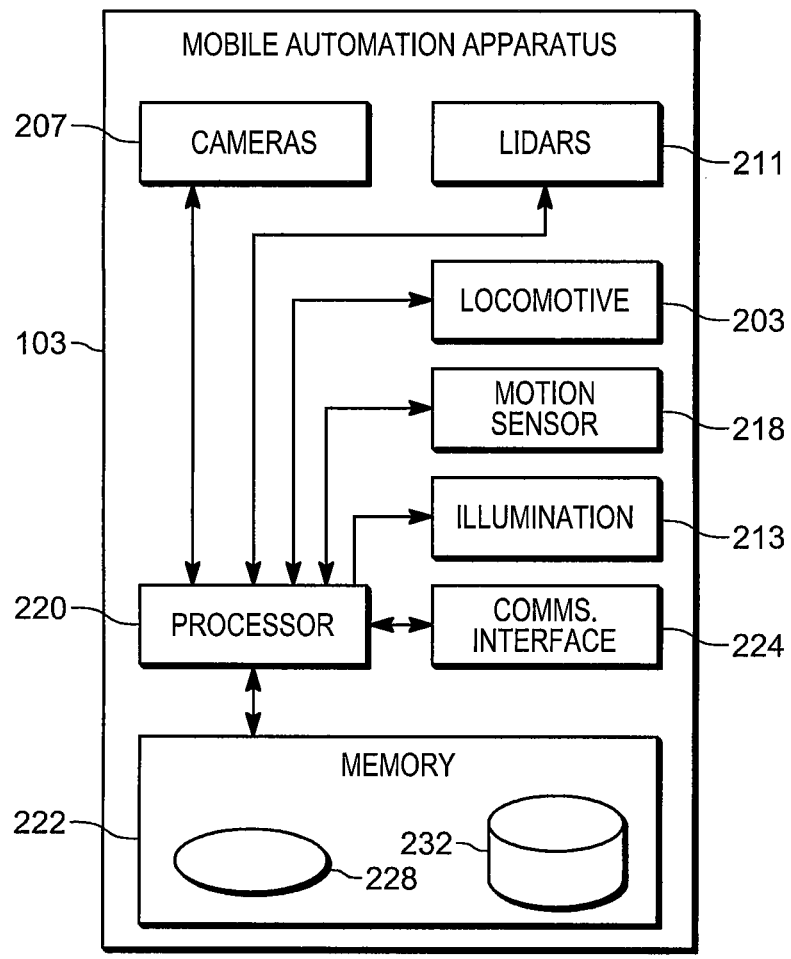
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 also includes a motion sensor 218, shown in FIG. 2B. The motion sensor 218 is configured to collect motion data defining movement of the apparatus 103, and can therefore include an inertial measurement unit (IMU) including a combination of accelerometer(s) and gyroscope(s). The motion sensor 218 can also include, in some embodiments, a wheel speed sensor integrated with the locomotive mechanism 203.

The mobile automation apparatus 103 includes a special-purpose navigational controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103, and in particular to capturing mapping and localization data according to a mapping trajectory, and dynamically altering the mapping trajectory to provide the above-mentioned loop closures under certain conditions. The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, data captured during traversal of the above-mentioned mapping trajectory, for use in localization and map generation. The apparatus 103 may communicate with the server 101, for example to receive instructions to navigate to specified locations and initiate data capture operations, via a communications interface 224 over the link 107 shown in FIG. 1. As will also be discussed below, the apparatus 103 may communicate with the client device 105 during the mapping capture process, to receive operational commands and provide indications of alterations to the mapping trajectory. The communications interface 224 further enables the apparatus 103 to communicate with the server 101 via the dock 108 and the link 109.

As will be apparent in the discussion below, in other examples, some or all of the processing performed by the apparatus 103 may be performed by the server 101, and some or all of the processing performed by the server 101 may be performed by the apparatus 103. That is, although in the illustrated example the application 228 resides in the mobile automation apparatus 103, in other embodiments the actions performed by some or all of the components of the apparatus 103 may be performed by the processor 120 of the server 101, either in conjunction with or independently from the processor 220 of the mobile automation apparatus 103. As those of skill in the art will realize, distribution of navigational computations between the server 101 and the mobile automation apparatus 103 may depend upon respective processing speeds of the processors 120 and 220, the quality and bandwidth of the link 107, as well as criticality level of the underlying instruction(s).

Figure 2C:
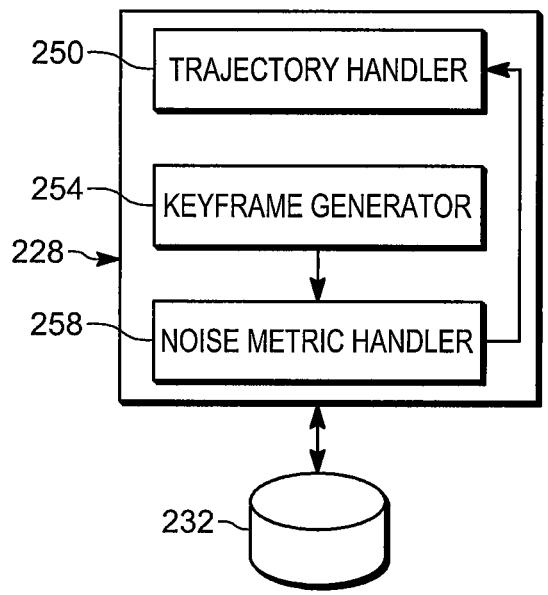
FIG. 2C is a block diagram of certain internal components of the mobile automation apparatus of FIG. 1.

Turning now to FIG. 2C, before describing the actions taken by the apparatus 103 to perform localization, certain components of the application 228 will be described in greater detail. As will be apparent to those skilled in the art, in other examples the components of the application 228 may be separated into distinct applications, or combined into other sets of components. Some or all of the components illustrated in FIG. 2C may also be implemented as dedicated hardware components, such as one or more ASICs or FPGAs.

The application 228 includes a mapping trajectory handler 250 configured to maintain a mapping trajectory to be followed by the apparatus 103 during traversal of the facility to capture data for map generation. The application 228 further includes a keyframe generator 254 configured to control the locomotive mechanism 203 to travel through the facility autonomously, in response to operational commands received from an operator (e.g. via the client device 105), or a combination thereof. The keyframe generator 254 is also configured to periodically capture data, using the sensors noted above (which may be generally referred to as navigational sensors). Each set of captured data is referred to as a keyframe, and the keyframe generator 254 is also configured to generate a current estimated pose of the apparatus 103 (e.g. according to the frame of reference 102) for each keyframe. The keyframe generator 254 is also configured to detect loop closures, in the form of keyframes matching previously captured keyframes (indicating that the apparatus 103 has returned to a previously captured location).

The application 228 further includes a noise metric handler 258 configured, for each keyframe generated by the keyframe generator 254, to determine a noise metric indicative of a level of uncertainty of the estimated pose for that keyframe relative to the estimated pose for a preceding keyframe. The noise metric handler 258 is also configured to assess an accumulated noise level for at least some of the keyframes, indicating an accumulated level of uncertainty since an initial keyframe (e.g. at the beginning of the mapping trajectory). The mapping trajectory handler 250 is configured to alter the above-mentioned trajectory responsive to the assessment of accumulated noise level by the noise metric handler, as will be discussed below.

Figure 3:
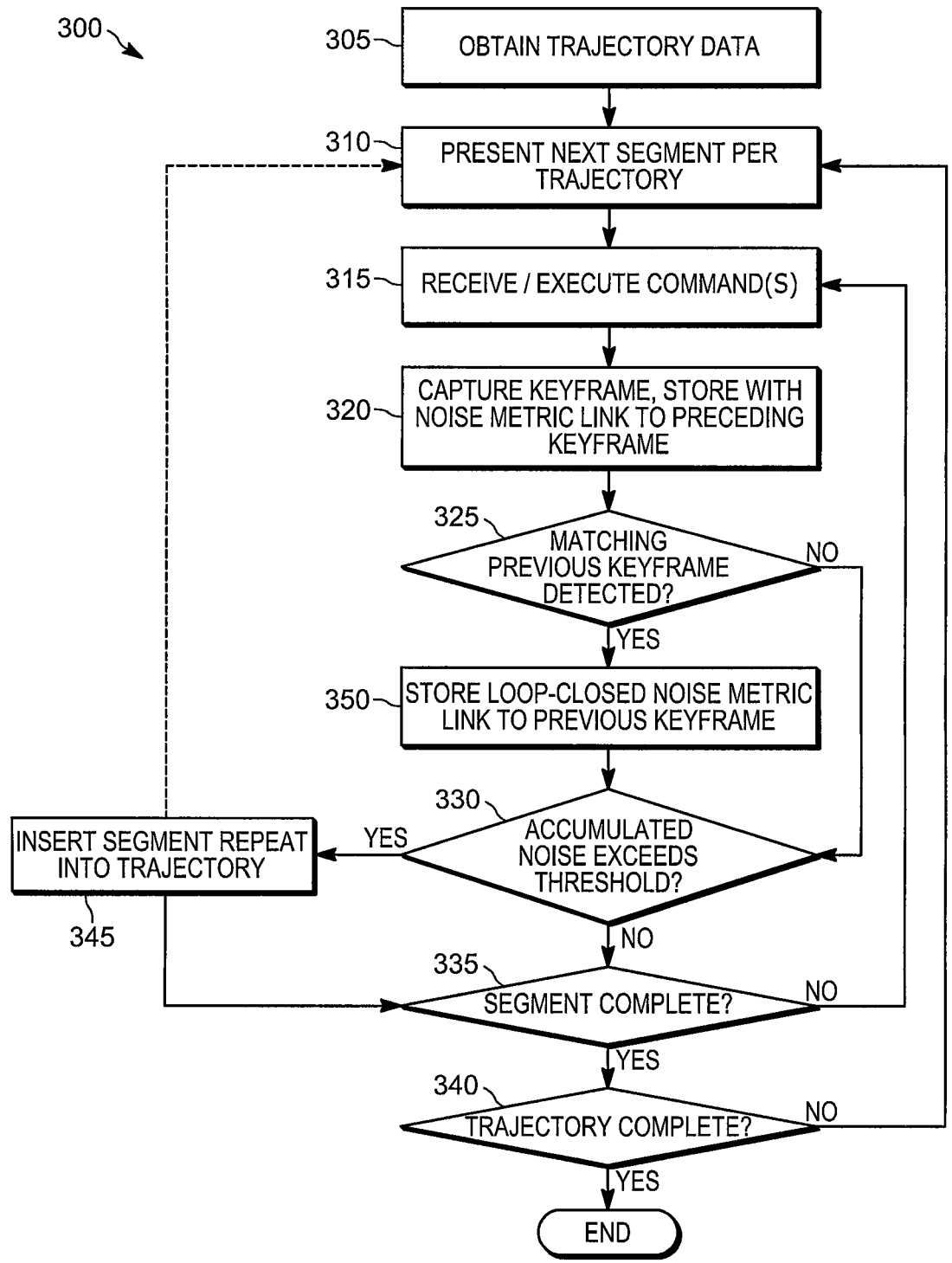
FIG. 3 is a flowchart of a method for dynamic loop closure in mapping trajectories for the mobile automation apparatus of FIG. 1.

The functionality of the application 228 will now be described in greater detail. In particular, the mapping data collection and loop-closure mechanism mentioned above will be described as performed by the apparatus 103. Turning to FIG. 3, a method 300 of dynamic loop closure in mapping trajectories is shown. The method 300 will be described in conjunction with its performance by the apparatus 103, with reference to the components illustrated in FIGS. 2B and 2C.

Figure 4A:
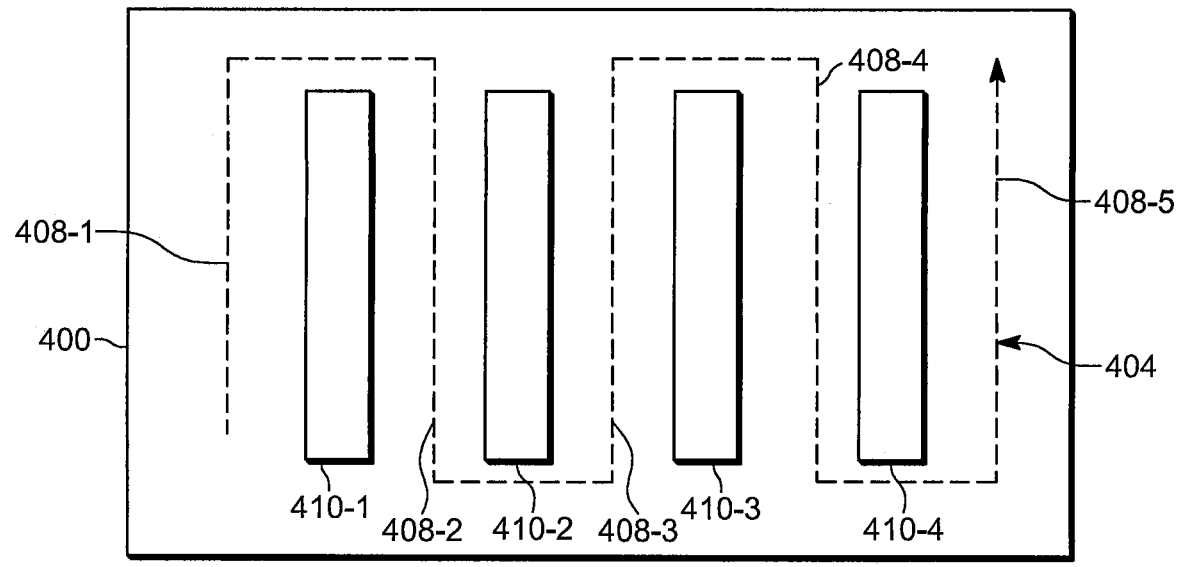
FIG. 4A is a diagram illustrating an overhead view of a mapping trajectory within a facility.

At block 305, the apparatus 103, and particularly the trajectory handler 250, is configured to obtain mapping trajectory data. The mapping trajectory data defines a plurality of trajectory segments each corresponding to a region of the facility to be mapped. The mapping trajectory data can be obtained, for example, by retrieval from the server 101, where the mapping trajectory data can be stored in the repository 132. The specific nature of the segments defined by the mapping trajectory data may vary according to the layout of the facility. In the present example, in which the facility is a retail facility containing a plurality of shelf modules 110 arranged into aisles, the segments each correspond to an aisle defined by a set of shelf modules 110. Turning to FIG. 4A, an overhead view of a facility 400 is shown, including a plurality of shelves 410-1, 410-2, 410-3 and 410-4. The shelves 410 define aisles (i.e. spaces between the shelves 410), through which the apparatus 103, as well as customers and the like, can travel.

Also illustrated in FIG. 4A is a mapping trajectory 404 including a plurality of segments 408-1, 408-2, 408-3, 408-4 and 408-5. As will be apparent, the segments 408 each correspond to one of the above-mentioned aisles. In other examples, however, the segments need not correspond to the aisles, and can instead correspond to smaller or larger regions of the facility 400 than those represented by the aisles.

The mapping trajectory data can also define one or more instructions associated with each segment 408, to be presented to an operator of the apparatus 103 via display (e.g. the assembly 106 of the client device 105). That is, during the traversal of the trajectory 404, the apparatus 103 is assisted by an operator rather than operating entirely autonomously. Therefore, the apparatus 103 is configured, based on the mapping trajectory data, to provide instructions informing the operator of where in the facility to pilot the apparatus 103. Example mapping trajectory data is shown below in Table 1, including the above-mentioned instructions.

TABLE 1

Example mapping trajectory data

| Segment ID | Operator Instructions | Status |
|---|---|---|
| 408-1 | Travel along Aisle 1 | Pending |
| 408-2 | Travel along Aisle 2 | Pending |
| 408-3 | Travel along Aisle 3 | Pending |
| 408-4 | Travel along Aisle 4 | Pending |
| 408-5 | Travel along Aisle 5 | Pending |

As seen above, in addition to a segment identifier and associated operator instructions, the mapping trajectory data includes a status indicator for each segment. The status indicator can include, for example an indication of whether traversal of the segment is complete or not. In the present example, each segment 408 is shown as "pending", indicating that none of the segments 408 have been completed. A wide variety of other status indicators may also be employed, including binary flags (e.g. the value "1" for a completed segment, and the value "0" for an incomplete segment) and the like.

Figure 4B:
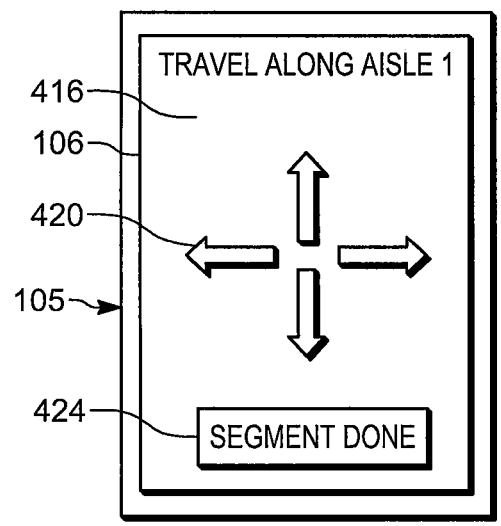
FIG. 4B is a diagram illustrating an interface presented on the client device of FIG. 1.

Returning to FIG. 3, at block 310 the apparatus 103 (specifically, the trajectory handler 250) is configured to select the next incomplete segment 408 and to present the selected segment via an output device. In the present example, the apparatus 103 is configured to transmit the operator instruction for the selected segment 408 to the client device 105, for presentation on the assembly 106. FIG. 4B illustrates a rendered operator instruction 416 on the assembly 106. The assembly 106 also renders, as shown in FIG. 4B, selectable navigational elements 420 by which the client device 105 is configured to receive operational commands from the operator and transmit the operational commands to the apparatus 103 for execution via control of the locomotive mechanism 203 by the processor 220. The operational commands mentioned above are employed to pilot the apparatus 103 according to the instruction 416. FIG. 4B also illustrates a selectable element 424 for indicating that a segment 408 of the trajectory 404 is complete.

Figure 5A:
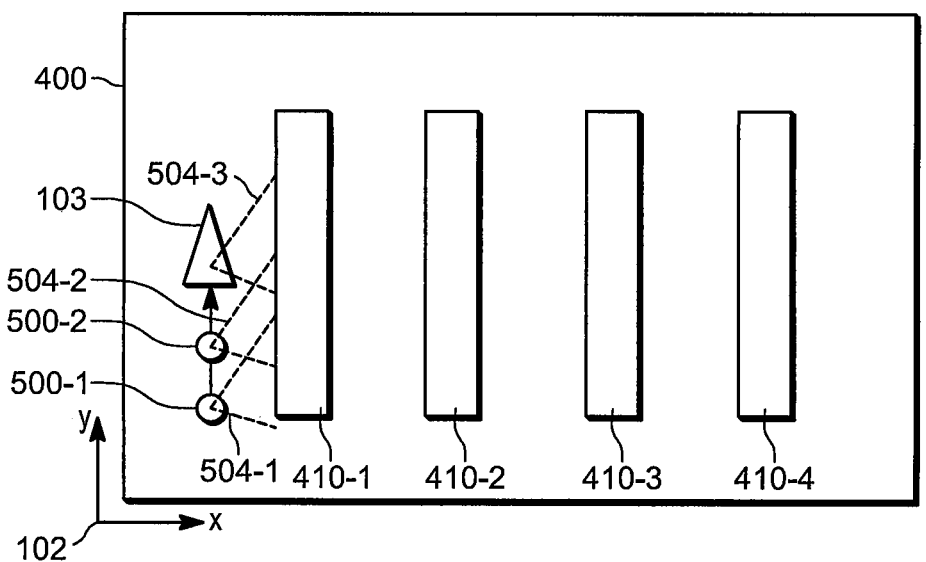
FIG. 5A is a diagram illustrating traversal of the trajectory of FIG. 4 by the mobile automation apparatus of FIG. 1.

Referring again to FIG. 3, at block 315 the apparatus 103 is configured to receive and execute the above-mentioned operational commands. Referring to FIG. 5A, a current position of the apparatus 103 within the facility 400 is illustrated, following travel by the apparatus 103 along a portion of the segment 408-1 shown in FIG. 4A. The travel shown in FIG. 5A can be effected, for example, by the receipt of operational commands from the client device 105 responsive to selections of the selectable navigational elements 420 at the client device 105. Returning again to FIG. 3, at block 320 the apparatus 103 is configured to capture at least one keyframe during the performance of block 315. Block 320, as well as subsequent blocks of the method 300, may be performed repeatedly during the performance of block 315. That is, the apparatus 103 can continue to receive and execute additional operational commands while performing blocks 320 as well as some or all of blocks 330-350.

The apparatus 103, and in particular the keyframe generator 254, is configured to capture a keyframe using sensor data captured via the navigational sensors of the apparatus 103. In the present example, each keyframe is generated at block 320 using data captured by the motion sensor 218 (e.g. an IMU) and data captured by an environmental sensor such as one or more of the cameras 207 and/or one or more of the lidars 211. The keyframe captured at block 320 includes sensor data (e.g. image data and/or lidar scan data, in the present example) representing the surroundings of the apparatus 103 from the current pose of the apparatus within the facility 400. The keyframe also includes an estimated pose generated at block 320, indicating both the location of the apparatus 103 and the orientation of the apparatus 103 with respect to the frame of reference 102.

The estimated pose is generated at block 320 based on a preceding pose (corresponding to the preceding keyframe), as well as on one or both of the motion data from the motion sensor 218 and the environmental data from the environmental sensor. For example, odometry data from the motion sensor 218 indicates changes in orientation, as well as distance travelled by the apparatus 103, since the preceding keyframe. Further, environmental sensor data such as a lidar scan may indicate, based on a degree to which the current scan data matches the preceding scan data, a change in pose between the preceding pose and the current pose.

In other words, the apparatus 103 is configured to determine an estimated pose for each keyframe relative to the previous keyframe. The determination of estimated pose at block 320 may be subject to certain errors, however. For example, the motion sensor 218 may be subject to a degree of measurement error, drift or the like. Further, the matching of environmental sensor data such as a lidar scan to a preceding lidar scan maybe subject to an imperfect confidence level, indicating that the features matched between the two scans may not actually correspond to the same physical features in the facility 400.

At block 320, the keyframe generator 254 is therefore also configured to generate a noise metric corresponding to the estimated pose, and to store the noise metric in association with the keyframe. The noise metric indicates a level of uncertainty associated with the estimated pose, relative to the preceding estimated pose, arising from the above-noted sources of potential error. For example, the noise metric can be generated based on a confidence level associated with feature-matching between the current lidar scan and the preceding lidar scan, and based on a known (e.g. from manufacturer specifications) degree of drift of the motion sensor 218. For example, the drift portion of the noise metric may be proportional to the distance travelled since the previous keyframe, while the scan-matching portion of the noise metric may be inversely proportional to the confidence level of the scan-matching process.

Returning to FIG. 5A, two previous performances of block 320 are illustrated. Specifically, a sequence of keyframes including a first keyframe 500-1 and a second keyframe 500-2 is shown as having been generated at the locations shown in FIG. 5A. Each keyframe 500 contains an environmental scan (e.g. a lidar scan, as noted above), corresponding to a respective sensor field of view 504-1, 504-2. As will now be apparent, at the current position of the apparatus 103, a further performance of block 320 will lead to the generation of a further keyframe including sensor data from the field of view 504-3. Each keyframe 500 also includes an estimation of the pose of the apparatus 103 at the capture location, according to the frame of reference 102.

Figure 5B:
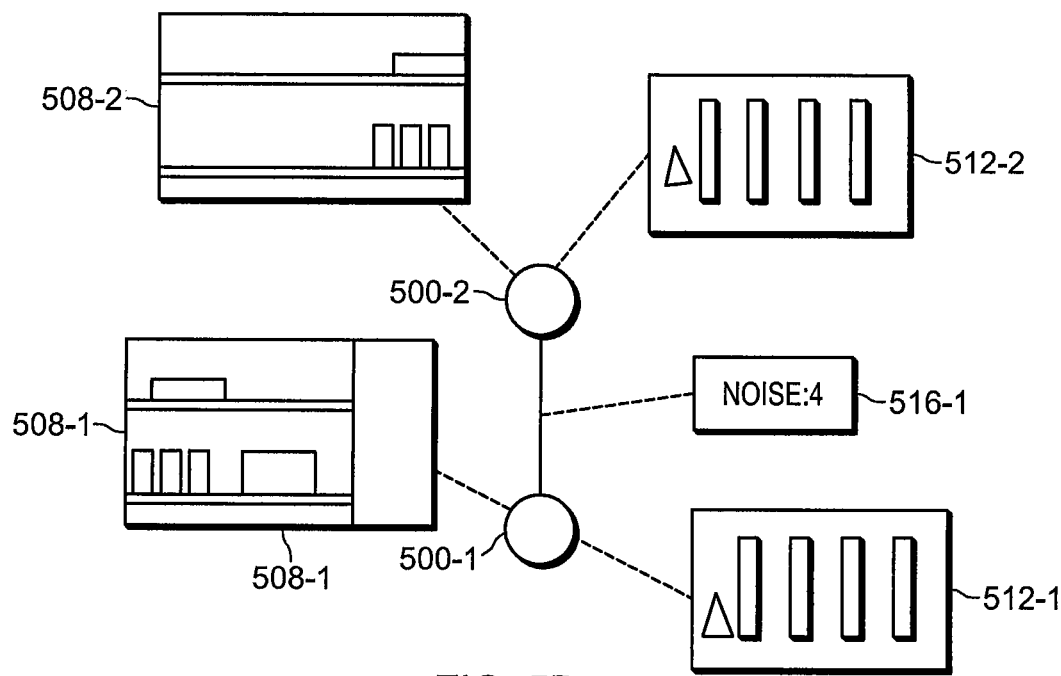
FIG. 5B is a diagram illustrating keyframes generated by the mobile automation apparatus of FIG. 1 during the traversal shown in FIG. 5A.

FIG. 5B graphically illustrates the contents of the keyframes 500-1 and 500-2, although it will be understood that the keyframe need not be stored graphically. Indeed, any of a wide variety of suitable formats may be employed to store the data contained in each keyframe 500. Specifically, each of the keyframes 500-1 and 500-2 includes scan data (e.g. lidar scan data) 508-1, 508-2 captured from the corresponding field of view 504. Each keyframe 500 also includes an estimated pose 512-1, 512-2 indicating the estimated pose of the apparatus 103 at the time the scan data 508 was captured. Data captured via the motion sensor 218 can also be stored (not shown) with each keyframe 500, such as values indicating changes of orientation and distance travelled since the previous keyframe 500. In addition, at shown in FIG. 5B, a noise metric 516-1 is stored in association with each pair of adjacent keyframes. In the present example, the keyframes 500 are stored in a graph, and the noise metric 516 is stored on an edge between adjacent nodes (i.e. as a link between the nodes) of the graph.

As seen in FIG. 5B, the estimated pose 512-2 indicates that the apparatus 103 is angled relative to the Y axis of the frame of reference 102. In reality, the apparatus 103 remained parallel to the Y axis through the keyframes 500-1 and 500-2. The change in orientation shown in the estimated pose 512-2 therefore represents a degree of sensor error. The value of the noise metric indicates a level of uncertainty associated with the estimated pose 512-2 relative to the estimated pose 512-1 as a result of the above-mentioned sensor error. Higher values of the noise metric indicated greater levels of uncertainty.

Returning to FIG. 3, at block 325 the apparatus 103 is configured to determine whether the keyframe generated at block 320 contains environmental data matching the environmental data of a previous keyframe to at least a threshold degree of confidence. The performance of block 325 constitutes the detection of a loop closure, i.e. a detection by the apparatus 103 that the current pose is a revisiting of a previously captured pose. For example, the determination at block 325 can include determining whether the lidar scan data captured for the current keyframe matches any previously generated keyframe to at least a threshold degree of confidence (e.g. 70%, although a variety of other thresholds may also be applied).

In the present example performance of the method 300, it is assumed that the determination at block 325 is negative, as the scan data 508 of the keyframes 500 shown in FIG. 5B do not match to a degree that satisfies the threshold. The performance of the method 300 therefore proceeds to block 330. At block 330, the apparatus 103 (and particularly, the noise metric handler 258) is configured to determine whether, for the current keyframe, an accumulated noise level exceeds a threshold. The accumulated noise level is determined from the noise metrics generated at each previous performance of block 320, between the current keyframe and an initial keyframe. The initial keyframe, in the present example, is the first keyframe (i.e. generated at the beginning of the trajectory obtained at block 305). In other examples, however, multiple initial keyframes may be employed during the traversal of a trajectory. For example, the first keyframe (the keyframe 500-1 as shown in FIG. 5A) can be employed as the initial keyframe until the segment 408-4 is reached, following which the first keyframe captured during traversal of the segment 408-4 may be employed as the initial keyframe. The accumulated noise level indicates a cumulative degree of error between the initial keyframe and the current keyframe, imposed by the noise metrics associated with each adjacent pair of keyframes.

In the present example performance of the method 300, it is assumed that the threshold applied at block 330 has a value of 43. As will be apparent in the discussion of accumulated noise below, any of a wide variety of noise metrics and associated thresholds may be employed, and the value of 43 is employed herein purely for illustrative purposes. Following the generation of the keyframe 500-2 and the estimated pose 512-2 (with the associated noise metric 516-1 having a value of 4), the determination at block 330 is therefore negative.

When the determination at block 330 is negative, the apparatus 103 determines at block 335 whether the current segment (presented at block 310) is complete. For example, the determination at block 335 can include a determination as to whether the selectable element 424 shown in FIG. 4B has been selected by the operator of the client device 105. When the determination at block 335 is negative the apparatus 103 returns to block 315 to continue receiving and executing operational commands, as well as generating further keyframes, for the current segment. Keyframe generation at block 320 can be performed at preconfigured intervals, such as at predefined travel distances (e.g. a new keyframe can be generated after each displacement of two meters), predefined time periods, or the like. When the determination at block 335 is affirmative, the apparatus 103 is configured to determine, at block 340, whether the entire trajectory is complete (e.g. whether indications have been received that each segment listed in the trajectory data is complete). When the determination at block 340 is affirmative, the performance of the method 300 ends, and when the determination at block 340 is negative, the next segment is selected from the trajectory data obtained at block 305, and presented at block 310.

Figure 6A:
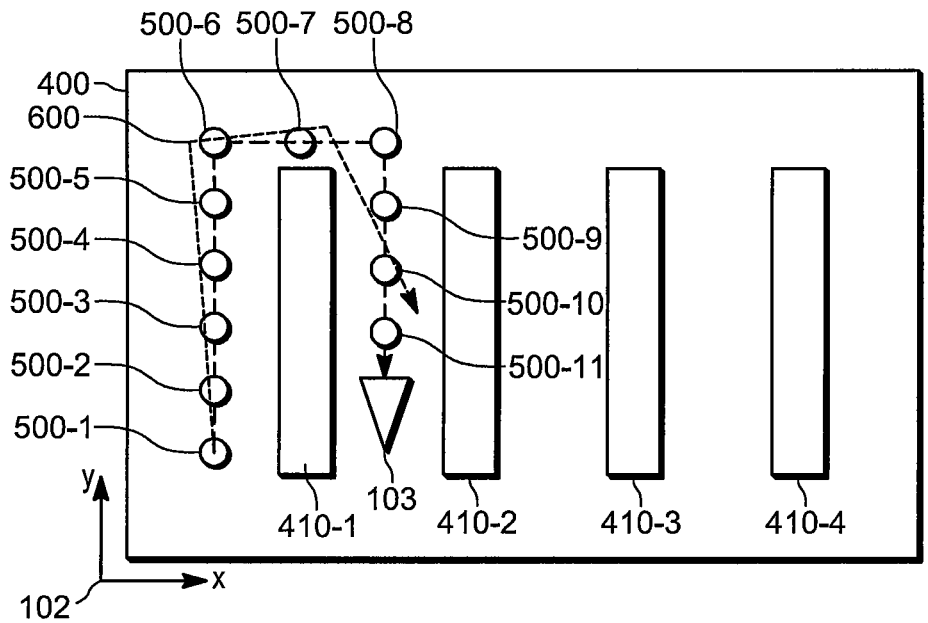
FIG. 6A is a diagram illustrating further traversal of the trajectory of FIG. 4 by the mobile automation apparatus of FIG. 1.

Turning to FIG. 6A, the facility 400 is illustrated following the completion of the segment 408-1 of the trajectory 404, as well as a portion of the segment 408-2. Thus, a number of additional keyframes 500-3, 500-4, 500-5, 500-6, 500-7, 500-8, 500-9, 500-10 and 500-11 have been generated through repeated performances of block 320. The keyframes 500 each contain an estimated pose, and due to accumulating sensor errors in the estimated poses, a perceived trajectory 600 (shown as a dotted line) defined by the estimated poses deviates from the actual trajectory (shown as a dashed line) taken by the apparatus 103. Uncorrected, the perceived trajectory 600 may lead to the generation of a distorted map of the facility 400.

Figure 6B:
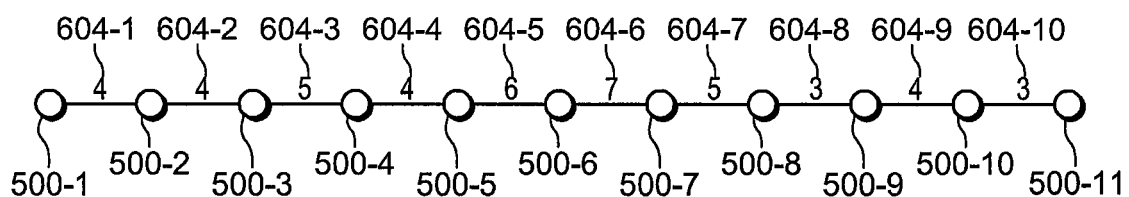
FIG. 6B is a diagram illustrating further keyframes generated by the mobile automation apparatus of FIG. 1 during the traversal shown in FIG. 6A.
Figure 6C:
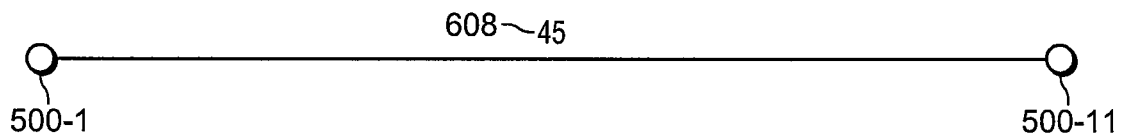
FIG. 6C is a diagram illustrating an accumulated noise level determined by the mobile automation apparatus following the traversal shown in FIG. 6A.

FIG. 6B illustrates a set of noise metrics 604-1, 604-2, 604-3, 604-4, 604-5, 604-6, 604-7, 604-8, 604-9 and 604-10 associated with respective adjacent pairs of keyframes 500. At a further performance of block 330 following the generation of the keyframe 500-11, the apparatus 103 is configured to determine the accumulated noise between the first keyframe 500-1 and the current keyframe 500-11. In the present example, the determination of accumulated noise is made by handling the noise metrics in a manner analogous to electrical resistors. Thus, the accumulated noise 608 for a set of noise metrics in series is the sum of each individual noise metric. In other words, the accumulated noise between the keyframes 500-1 and 500-1, as shown in FIG. 6B, has a value of 45.

As noted above, in the present example performance of method 300, the threshold applied at block 330 has a value of 43. Thus, the accumulated noise level of 45 exceeds the threshold, and the determination at block 330 is affirmative. Following an affirmative determination at block 330, the apparatus 103 is configured to proceed to block 345. At block 345, the trajectory handler 250 is configured, responsive to receiving an indication from the noise metric handler 258 that the threshold has been exceeded, to dynamically modify the trajectory data by inserting a repeated segment into the trajectory. The repeated segment is selected from one of the previously completed segments of the trajectory. In the present example, therefore, the first segment 408-1 is selected for insertion into the trajectory 404 at block 345. When a plurality of previously completed segments 408 are available for selection, the apparatus 103 can apply any suitable selection criteria for the selection of a segment to insert into the trajectory. For example, the apparatus 103 may be configured to select the segment nearest to the current estimated pose of the apparatus 103, to reduce required travel time to reach the selected segment.

Having selected a previously completed segment to repeat, the apparatus 103 is configured to insert the selected repeat segment into the trajectory data obtained at block 305, and to return to block 310. The insertion may be made immediately following the current segment, for example. In other embodiments, the current segment (e.g. the segment 408-2 in the present example) may be aborted and the repeat segment may be presented immediately upon selection. Table 2 illustrates an example of updated trajectory data following the performance of block 345.

TABLE 2

Example updated mapping trajectory data

| Segment ID | Operator Instructions | Status |
|---|---|---|
| 408-1 | Travel along Aisle 1 | Complete |
| 408-2 | Travel along Aisle 2 | Pending |
| 408-1 | Return to Aisle 1 | Pending |
| 408-3 | Travel along Aisle 3 | Pending |
| 408-4 | Travel along Aisle 4 | Pending |
| 408-5 | Travel along Aisle 5 | Pending |

As seen above, an entry has been added to the trajectory data after the segment 408-2 is complete, indicating a repetition of the segment 408-1. Therefore, following completion of the segment 408-2, the segment 408-1 will be repeated before the apparatus 103 instructs the operator to proceed to the segment 408-3.

Figure 7A:
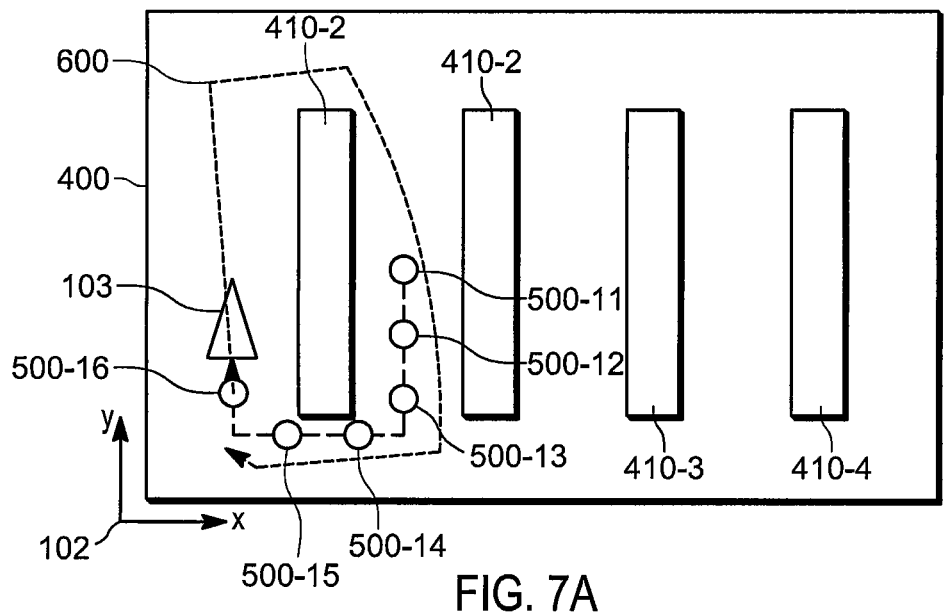
FIG. 7A is a diagram illustrating traversal of an altered trajectory generated by the mobile automation apparatus of FIG. 1.
Figure 7B:
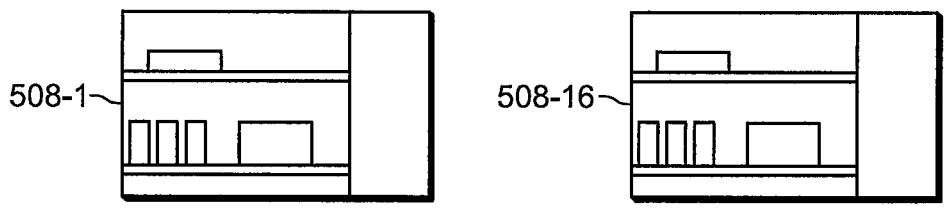
FIG. 7B is a diagram illustrating matching sets of scan data captured by the mobile automation apparatus during the traversal illustrated in FIGS. 5A and 7A.

Turning to FIG. 7A, further keyframes 500-11, 500-12 and 500-13 are illustrated, completing the segment 408-2. In addition, keyframes 500-14, 500-15 and 500-16 are shown travelling to and beginning repetition of the segment 408-1, according to the dynamically updated trajectory data shown above in Table 2. As mentioned earlier, following each keyframe capture, the apparatus 103 is configured to determine at block 325 whether the current keyframe matches a previous keyframe. As will be apparent from FIG. 7A, the keyframe 500-16 is captured from substantially the same pose in the facility 400 as was the keyframe 500-1. The estimated pose of the apparatus 103, as indicated by the perceived trajectory 600, does not indicate that the poses corresponding to the keyframes 500-1 and 500-16 are substantially the same, due to accumulated sensor error. However, the lidar scans (or any other suitable environmental data) contained in the keyframes 500-1 and 500-16, as shown in FIG. 7B, display a high degree of similarity. For example, the confidence level generated for a match between the scan data 508-1 and the scan data 508-16 is assumed to be 92% in the present example.

Figure 7C:
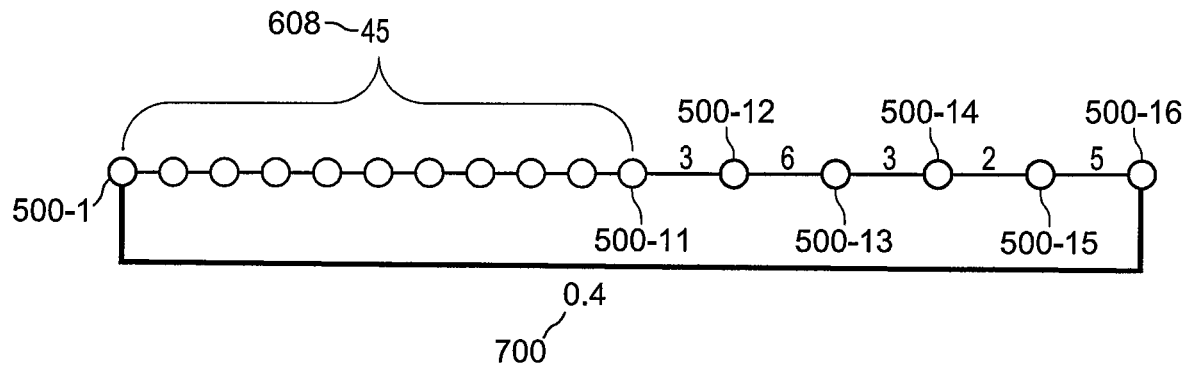
FIG. 7C is a diagram illustrating additional keyframes generated by the mobile automation apparatus, as well as a loop-closed noise metric, during the traversal shown in FIG. 7A.

The above-noted scan-matching confidence level exceeds the 70% threshold mentioned earlier, and the determination at block 325 is therefore affirmative. Responsive to an affirmative determination at block 325, the apparatus 103 is configured to proceed to block 350. At block 350, in addition to the noise metric generated at block 320 (indicating a noise level between the keyframes 500-15 and 500-16), the apparatus 103 is configured to store a loop-closed noise metric linking the current keyframe (500-16) with the previous keyframe matched at block 325 (i.e. the keyframe 500-1 in the present example). FIG. 7C illustrates the storage of a loop-closed noise metric 700 in the pose graph containing the keyframes 500-1 to 500-16 as nodes, as well as the noise metrics stored between each adjacent pair of nodes (for clarity of illustration, the noise metrics for the keyframes 500-1 to 500-11 are represented by the accumulated noise metric "45" as discussed earlier).

The loop-closed noise metric 700, in the present example, has a predefined value indicating a low level of sensor noise. In other examples, the loop-closed noise metric 700 can be assigned a value based on the confidence level associated with the match between the scan data 508-1 and 508-16. As will now be apparent, the loop-closed noise metric 700 is a link between the keyframes 500-1 and 500-16 that is parallel to the link between the keyframes 500-1 and 500-16 defined by the noise metrics assigned to each successive pair of keyframes 500.

Figure 8A:
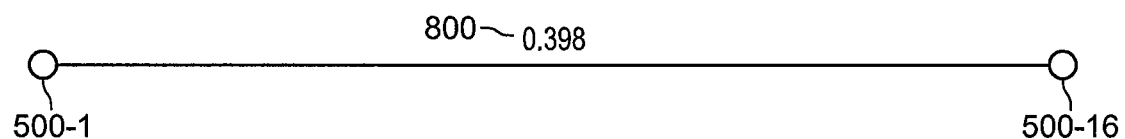
FIG. 8A is a diagram illustrating an accumulated noise level determined by the mobile automation apparatus following the traversal shown in FIG. 7A.

Following storage of the loop-closed noise metric at block 350, the apparatus 103 is configured to proceed to block 330 as discussed above. In the present example performance of block 330, the electrical resistor model mentioned earlier is applied. The accumulated noise between the keyframes 500-1 and 500-16 is therefore determined as the inverse of the sum of the parallel noise metrics connecting the keyframes 500-1 and 500-16. The keyframes 500-1 and 500-16 are connected by the loop-closed noise metric 700, as well as by the series of noise metrics 604, with a sum of 64. Therefore, the accumulated noise between the keyframes 500-1 and 500-16 is the inverse of the sum of the values of 1/64 and 1/0.4. As shown in FIG. 8A, the accumulated noise 800 therefore has a value of 0.398, which is well below the threshold of 43 mentioned earlier. The determination at block 330 is therefore negative, and the performance of the method 300 continues at block 335 as described above.

Figure 8B:
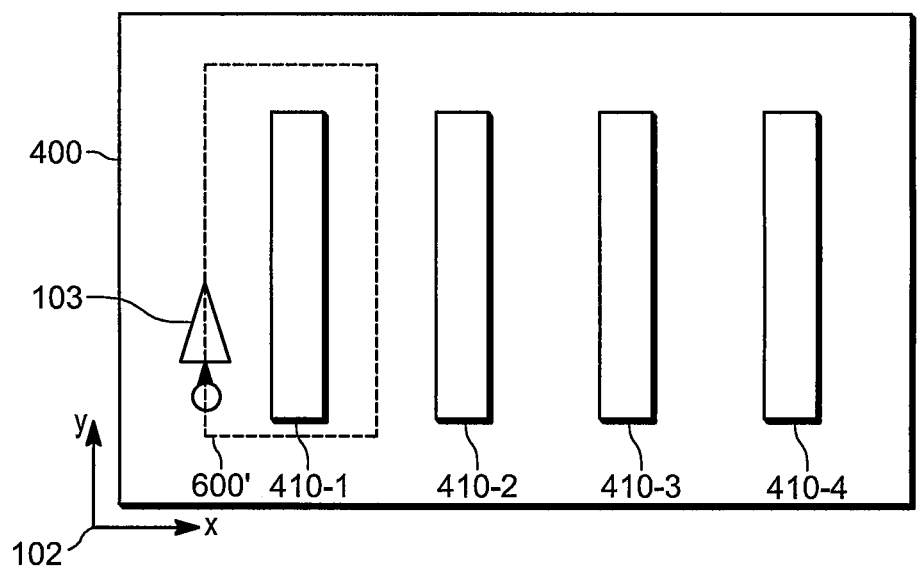
FIG. 8B is a diagram illustrating a corrected perceived trajectory of the mobile automation apparatus of FIG. 1.

As will be understood by those skilled in the art, the insertion of the loop closure indicating that the keyframes 500-1 and 500-16 correspond to substantially the same pose permits the apparatus 103 to correct the perceived trajectory 600 according to any suitable pose graph optimization algorithm. A corrected trajectory 600' is shown in FIG. 8B, in which the distortion present in FIG. 7A has been corrected via the added constraint provided by the loop closure (requiring that the keyframes 500-1 and 500-16 have the same pose).

As will now be apparent, therefore, performance of the method 300 by the apparatus 103 permits the apparatus 103 to dynamically alter the trajectory employed during the collection of mapping data, to increase the likelihood that loop closures will be detected at block 325 when sensor error accumulates beyond a threshold.

Variations to the above systems and methods are contemplated. For example, in some embodiments the apparatus 103 is configured to employ more than one threshold at block 325. For example, when the confidence level associated with a match between two sets of scan data 508 exceeds a primary threshold (e.g. 70% as mentioned above), the matching scan data candidates can be presented to the operator of the client device 105, along with a prompt to confirm that the sets of scan data 508 do in fact match. The apparatus 103 proceeds to block 350 only when an indication is received confirming the match (e.g. from the client device 105). When the confidence level exceeds a secondary threshold (e.g. 90%), the apparatus 103 is configured to proceed automatically to block 350.

In other embodiments, the performance of block 330 need not follow the capture of every keyframe 500. For example, block 330 may be performed only once every three keyframes, or any other suitable number of keyframes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for dynamic loop closure in a mobile automation apparatus, the method comprising:
at a navigational controller of the mobile automation apparatus, obtaining mapping trajectory data defining a plurality of trajectory segments traversing a facility to be mapped;
at the navigational controller, controlling a locomotive mechanism of the mobile automation apparatus to traverse a current one of the trajectory segments;
at the navigational controller, generating a sequence of keyframes for the current trajectory segment using sensor data captured via a navigational sensor of the mobile automation apparatus; and, for each keyframe:
determining an estimated pose of the mobile automation apparatus based on (i) the sensor data and (ii) a preceding estimated pose corresponding to a preceding one of the keyframes; and,
determining a noise metric defining a level of uncertainty associated with the estimated pose relative to the preceding estimated pose;
determining, for a selected keyframe, an accumulated noise metric based on the noise metrics for the selected keyframe and each previous keyframe in the sequence; and
when the accumulated noise metric exceeds a threshold, updating the mapping trajectory data to insert a repetition of one of the trajectory segments.

2. The method of claim 1, further comprising:
at the navigational controller, responsive to obtaining the mapping trajectory data, selecting one of the segments as the current segment, and presenting the current segment via an output assembly.

3. The method of claim 2, wherein presenting the current segment comprises at least one of (i) rendering the current segment on a display coupled to the navigational controller, and (ii) transmitting the current segment to a client device.

4. The method of claim 1, further comprising:
receiving operational commands via an input assembly connected to the navigational controller; and
controlling the locomotive mechanism according to the operational commands.

5. The method of claim 1, wherein the navigational sensor includes at least one of a motion sensor and an environmental sensor.

6. The method of claim 1, further comprising determining respective accumulated noise metrics for each keyframe.

7. The method of claim 1, wherein updating the mapping trajectory data includes identifying a previously completed trajectory segment, and inserting the previously completed trajectory segment into the trajectory data.

8. The method of claim 7, further comprising inserting the previously completed trajectory segment into the trajectory data following the current trajectory segment.

9. The method of claim 1, further comprising, for each keyframe:
determining whether the keyframe matches any one of the previous keyframes; and,
when the determination is affirmative, storing a loop closure noise metric linking the keyframe and the previous keyframe.

10. The method of claim 9, wherein the loop closure noise metric has a predefined uncertainty value.

11. A mobile automation apparatus comprising:
a memory;
a locomotive mechanism;
a navigational sensor;
a navigational controller connected to the memory, the locomotive mechanism and the navigational sensor; the navigational controller configured to:

obtain, from the memory, mapping trajectory data defining a plurality of trajectory segments traversing a facility to be mapped;

control the locomotive mechanism to traverse a current one of the trajectory segments;

generate a sequence of keyframes for the current trajectory segment using sensor data captured via the navigational sensor; and, for each keyframe:

determine an estimated pose of the mobile automation apparatus based on (i) the sensor data and (ii) a preceding estimated pose corresponding to a preceding one of the keyframes; and, determine a noise metric defining a level of uncertainty associated with the estimated pose relative to the preceding estimated pose;

determine, for a selected keyframe, an accumulated noise metric based on the noise metrics for the selected keyframe and each previous keyframe in the sequence; and when the accumulated noise metric exceeds a threshold, update the mapping trajectory data to insert a repetition of one of the trajectory segments.

12. The mobile automation apparatus of claim 11, wherein the navigational controller is further configured, responsive to obtaining the mapping trajectory data, to select one of the segments as the current segment, and present the current segment via an output assembly.

13. The mobile automation apparatus of claim 12, wherein the navigational controller is further configured to present the current segment by at least one of (i) rendering the current segment on a display coupled to the navigational controller, and (ii) transmitting the current segment to a client device.

14. The mobile automation apparatus of claim 11, wherein the navigational controller is further configured to:
receive operational commands via an input assembly connected to the navigational controller; and
control the locomotive mechanism according to the operational commands.

15. The mobile automation apparatus of claim 11, wherein the navigational sensor includes at least one of a motion sensor and an environmental sensor.

16. The mobile automation apparatus of claim 11, wherein the navigational controller is further configured to determine respective accumulated noise metrics for each keyframe.

17. The mobile automation apparatus of claim 11, wherein the navigational controller is further configured, to update the mapping trajectory data, to identify a previously completed trajectory segment, and insert the previously completed trajectory segment into the trajectory data.

18. The mobile automation apparatus of claim 17, wherein the navigational controller is further configured to insert the previously completed trajectory segment into the trajectory data following the current trajectory segment.

19. The mobile automation apparatus of claim 11, wherein the navigational controller is further configured, for each keyframe, to:
determine whether the keyframe matches any one of the previous keyframes; and,
when the determination is affirmative, store a loop closure noise metric in the memory linking the keyframe and the previous keyframe.

20. The mobile automation apparatus of claim 19, wherein the loop closure noise metric has a predefined uncertainty value.

* * * * *